(12) United States Patent
Lavi et al.

(10) Patent No.: US 8,683,346 B2
(45) Date of Patent: Mar. 25, 2014

(54) CLIENT INTEGRATION OF INFORMATION FROM A SUPPLEMENTAL SERVER INTO A PORTAL

(75) Inventors: Lior Lavi, Ramat-Gan (IL); Yaron Cohen, Givatiim (IL)

(73) Assignee: SAP Portals Israel Ltd., Ra'anana (IL)

( * ) Notice: Subject to any disclaimer, the term of this patent is extended or adjusted under 35 U.S.C. 154(b) by 999 days.

(21) Appl. No.: 12/272,188

(22) Filed: Nov. 17, 2008

(65) Prior Publication Data
US 2010/0125797 A1 May 20, 2010

(51) Int. Cl.
*G06F 3/00* (2006.01)

(52) U.S. Cl.
USPC ........... 715/742; 715/229; 715/255; 715/717; 715/733; 715/744; 715/968

(58) Field of Classification Search
USPC .......... 715/229, 255, 717, 733, 742, 744, 968
See application file for complete search history.

(56) References Cited

U.S. PATENT DOCUMENTS

| | | | | |
|---|---|---|---|---|
| 6,208,991 | B1 * | 3/2001 | French et al. | 1/1 |
| 2002/0138621 | A1 * | 9/2002 | Rutherford et al. | 709/227 |
| 2003/0233551 | A1 * | 12/2003 | Kouznetsov et al. | 713/175 |
| 2004/0250118 | A1 * | 12/2004 | Andreev et al. | 713/201 |
| 2006/0161662 | A1 * | 7/2006 | Ng et al. | 709/227 |
| 2006/0206922 | A1 * | 9/2006 | Johnson et al. | 726/4 |
| 2008/0282200 | A1 * | 11/2008 | Hamada | 715/856 |
| 2010/0037046 | A1 * | 2/2010 | Ferg et al. | 713/155 |

OTHER PUBLICATIONS

Mainsoft, "Integrating SharePoint Sites within WebSphere Portal", Nov. 2007, pp. 1-12.*

"Web Services for Remote Portlets Specification", Version 1.0, Sep. 3, 2003, Approved as an OASIS Standard Aug. 2003, 86 pages.

* cited by examiner

*Primary Examiner* — Shen Shiau

(74) *Attorney, Agent, or Firm* — Buckley, Maschoff & Talwalkar LLC

(57) ABSTRACT

According to some embodiments, a client accesses enterprise portal content from an enterprise portal server. The client also accesses supplemental content directly from a supplemental server. The supplemental server may, for example, be associated with a browser-based collaboration and/or document-management platform. Moreover, the client integrates the supplemental content into the enterprise portal content on a user interface display.

20 Claims, 6 Drawing Sheets

CLIENT INTEGRATION OF INFORMATION FROM A SUPPLEMENTAL SERVER INTO A PORTAL

FIELD

Some embodiments of the present invention may relate to business information enterprise systems. In particular, some embodiments may comprise systems and methods wherein a client may integrate supplemental information, such as information associated with a browser-based collaboration and/or document-management platform, with information associated with a portal, such as an enterprise portal.

BACKGROUND

A business information enterprise system may improve an organization's ability to monitor and/or manage data in a complex business environment. For example, such a system might store a large amount of business information, including a yearly global sales plan and profit data on both a company-wide and regional basis. Different users may then access the information in different ways. For example, a business analyst might be interested in a normalized comparison of each year's sales plan figures as compared to other years. A human resources administrator might instead want to access a list of employee names located in a particular country. In general, many different types of data could be stored by, and accessed from, a business information enterprise system (e.g., inventory data, sales data, and/or accounting data) and different types of data can often be used in different ways.

In some cases, business information is accessed through a Web-based "portal" that can display information to, and interact with, users. For example, a user might view business reports and/or select a particular item within a report to obtain further information about that item. Note that a user (or group of users) might want to customize the way in which information is displayed and/or interacted with via the portal and/or an associated enterprise portal server.

Note that some users may want to view and/or interact with information in addition to the information available directly from an enterprise portal server. For example, a user might want to access an integrated display that includes both enterprise portal information and supplemental information, such as information associated with a browser-based collaboration platform and/or a browser-based document-management platform.

FIG. 1 is a block diagram of a system 100 wherein a client apparatus 110 may display such integrated content to a user. In this case, the client 110 may transmit at (A) a request for content to a remote enterprise portal server 120. The enterprise portal server 120 may then at (B) transmit a request for supplemental content to a remote supplemental server 130. For example, a user may have selected a display that included both enterprise portal information and supplemental information (e.g., information associated with a browser-based collaboration platform and/or a browser-based document-management platform). In this case, the enterprise portal server 120 might determine that a portion of the information was not available from local enterprise resources (e.g., that the supplemental content is not available). As a result, the enterprise portal server 120 might request the additional information from the remote supplemental server 130.

In response to the request from the enterprise portal server 120, at (C) the supplemental server 130 provides the requested supplemental content to the enterprise portal server 120. These types of requests and/or responses might be associated with, for example, the Web Services for Remote Portals (WSRP) and/or Web Services for Interactive Applications (WSIA) protocols.

The enterprise portal server 120 may then combine that information with the data available from other sources (e.g., an enterprise database), and transmit the integrated content to the client 110 at (D) for display to the user.

Note, however, that such an approach may have a number of disadvantages. For example, the enterprise portal server 120 may need to locally store and manage user mappings 122 (or similar mechanism) to enable subsequent connections to the supplemental server. The user mappings 122 may, for example, include information about a number of different users and/or a number of different supplemental servers 130 (e.g., indicating which users access which supplemental servers 130 along with various default connection parameters and settings). Moreover, the user mappings 122 may need to include security information, including user names and associated passwords that are needed to access supplemental server accounts as appropriate. Storing and managing such user mappings 122 may be a time consuming and error-prone task, especially when there are a relatively large number of potential users and/or supplemental servers 130.

Approaches that may improve the integration of supplemental content into an enterprise portal display could, therefore, be desirable. Moreover, it may advantageous to provide one or more systems and/or methods to do so in an efficient and convenient manner.

DETAILED DESCRIPTION

Figure 1:
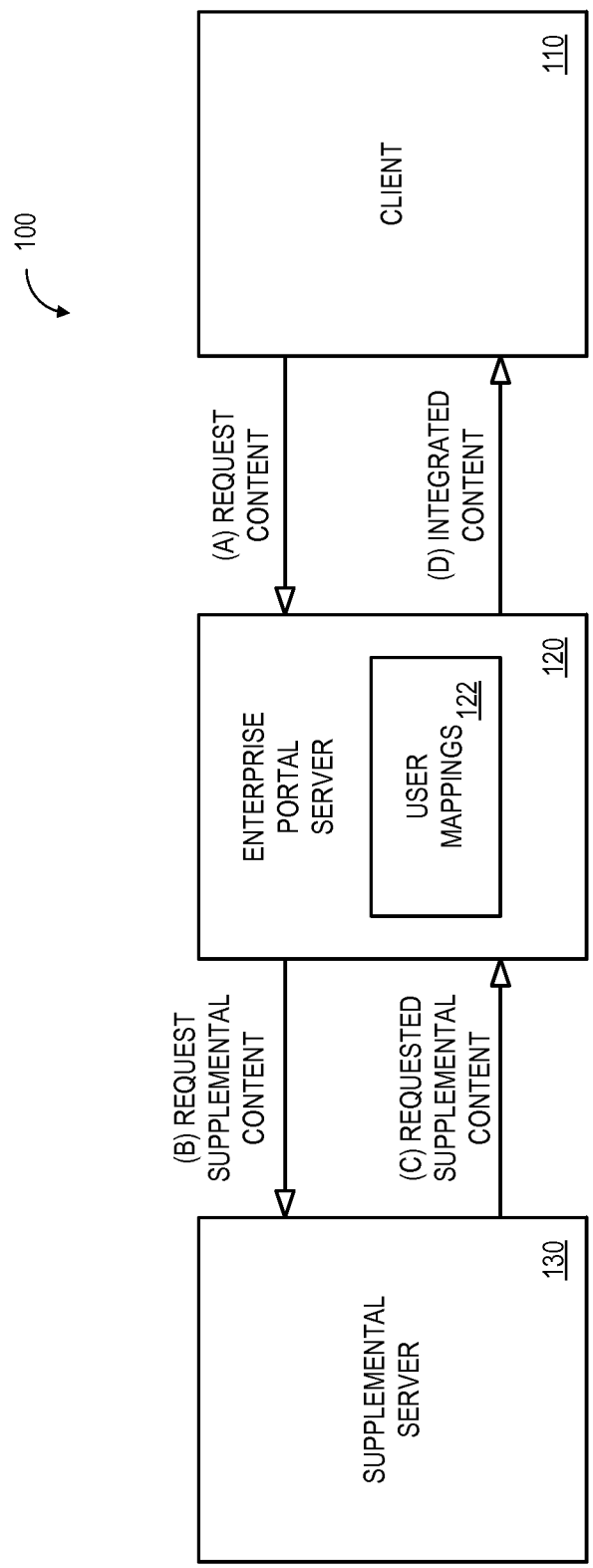
FIG. 1 is a block diagram of a system wherein a client apparatus may display integrated content to a user.
Figure 2:
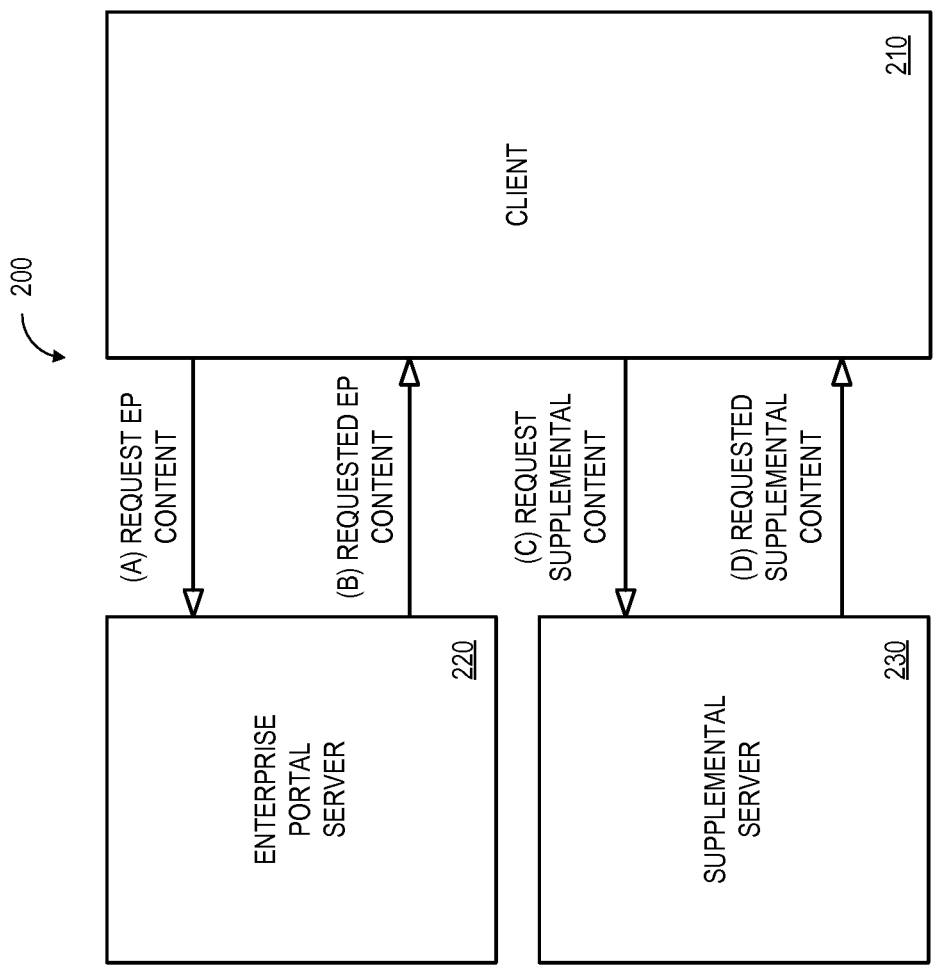
FIG. 2 is a block diagram of a system wherein a client apparatus may display integrated content to a user according to some embodiments of the present invention.

To alleviate problems inherent in the prior art, some embodiments of the present invention introduce systems, methods, computer program code, and means wherein a client may integrate supplemental information, such as information associated with a browser-based collaboration and/or document-management platform, with information from an enterprise portal. For example, FIG. 2 is a block diagram of a system 200 wherein a client apparatus 210 may display integrated content to a user according to some embodiments of the present invention.

The client 210 may be associated with, for example, a Web browser application executing at a user's Personal Computer (PC) or workstation. According to this embodiment, the client 210 may request enterprise portal content from a remote enterprise portal platform or server 220 at (A). The enterprise portal server 220 may then respond with the requested enterprise portal content at (B). Similarly, the client 210 may request supplemental content from a remote supplemental server 230 at (C). The supplemental server 230 may then respond with the requested supplemental content at (D).

As used herein, the phrase "supplemental content" might be associated with, for example, a browser-based collaboration and/or document-management platform that operates independently from the enterprise portal server 220. By way of example only, supplemental content might be associated with MICROSOFT® Office® SharePoint® information (e.g., from a SharePoint server) or ORACLE® Collaboration Suite information. A SharePoint server may, for example, host and provide access to shared workspaces, documents, and/or specialized applications via Web interfaces (e.g., using Web service techniques).

The client 210 may then integrate the supplemental content from the supplemental server 230 with the enterprise portal content from the enterprise portal server 220 and provide the integrated content via a user interface display (e.g., a display provided by a Web browser application executing at the client 210). Because the client 210 directly consumes content from the supplemental server 230, user mapping information can be stored at, and managed by, the client 210 instead of the enterprise portal server 220. As a result, a Total Cost of Ownership (TCO) associated with the enterprise portal server 220 may be reduced.

Note that the client, 210, enterprise portal server 220, and/or the supplemental server 230 may exchange information via one or more interfaces (e.g., a local interface connection or a communication network interface). Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between devices and/or systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a single client 210, enterprise portal server 220, and supplemental server 230 are illustrated in FIG. 2, note that any number of such devices, as well as the other elements described herein, may be provided.

Note that some or all of the devices illustrated in FIG. 2 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Note that embodiments are not limited to any specific combination of hardware and software. Moreover, the devices described herein might, for example, support any of the protocols in the following non-exhaustive list: Java Database Connectivity (JDBC), Java Connector (JCO), P4, and Simple Object Access Protocol (SOAP). Moreover, the databases might comprise a relational database accessible via a Structured Query Language (SQL) interface and/or systems which provide intermediary "business intelligence" to data stored within the database.

The client 210 might be associated with, for example, a workstation, a PC, or a mobile wireless device, such as a laptop computer, a Personal Digital Assistant (PDA), a tablet computer, a handheld computer, or any other suitable devices that are or become known.

Figure 3:
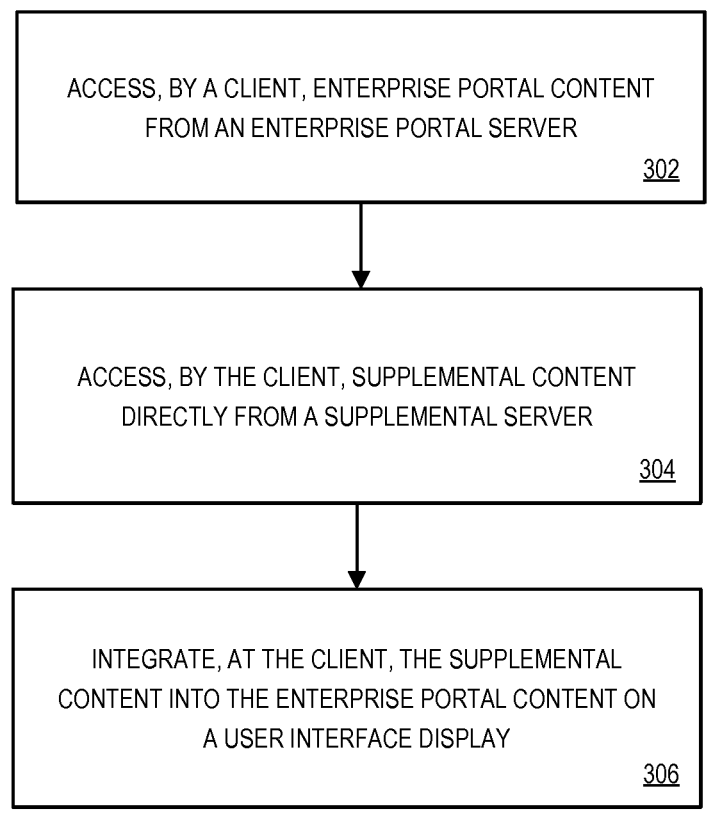
FIG. 3 is a flow diagram of a method of displaying integrated content to a user pursuant to some embodiments.

FIG. 3 is a flow diagram of a method of displaying integrated content to a user pursuant to some embodiments. The method might be associated with, for example, the system 200 of FIG. 2 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, a client may access enterprise portal content from an enterprise portal server. The enterprise portal content might be associated with, for example, an SAP® NetWeaver® portal that process accesses to a business warehouse database and/or a multi-dimensional enterprise database. According to some embodiments, a user may request such access via a client-based Web browser. Note that embodiments described herein might be associated with displays and portals other than the NetWeaver® portal.

At 304, the client may access supplemental content directly from a supplemental server. The supplemental content might be associated with, for example, a browser-based collaboration and/or document-management platform, such as a SharePoint list or library. Note that the supplemental content might represent or otherwise be associated with, for example: a text file, a word processing file, a spreadsheet file, a folder or library, a presentation file, calendar information, a webpart, and/or a Web portlet.

Figure 4:
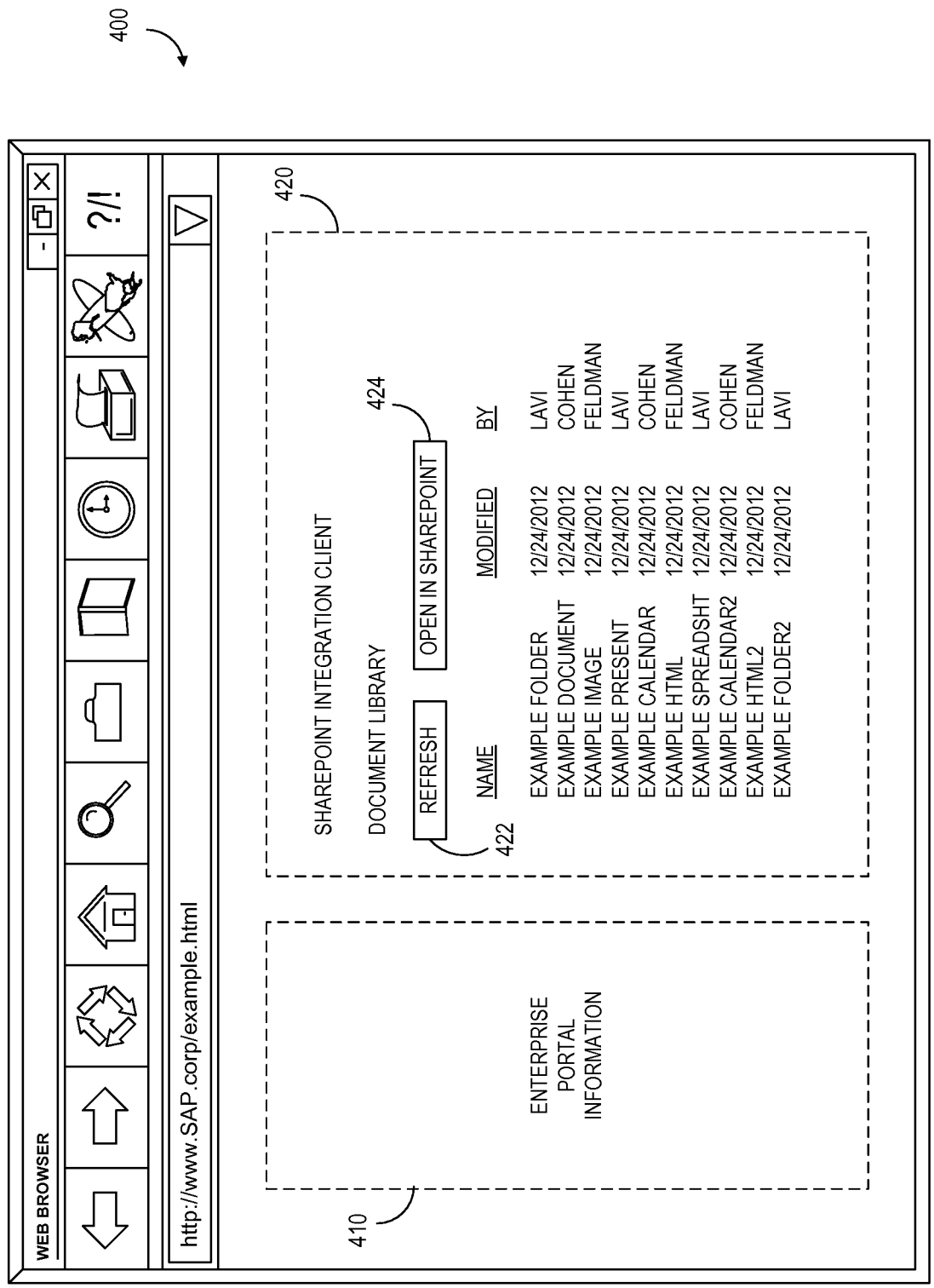
FIG. 4 is an example of a display of integrated content in accordance with some embodiments.

At 306, the client may integrate the supplemental content into the enterprise portal content on a user interface display. For example, FIG. 4 is an example of a display 400 of integrated content in accordance with some embodiments. Note that the embodiment of FIG. 4 is only one example of and user interfaces may be specific to a document library or other types of libraries and/or lists. In particular, the display 400 represents a Web browser providing both an enterprise portal information area 410 and a supplemental content area 420. Note that the supplemental content area 420 might be displayed above, next to, below, within, or around the enterprise portal information area 410. As a result, the supplemental content may expose the content of a list-like portlet from one portal in another.

In this example, the supplemental content area 420 is display a SharePoint document list, including a document name, a date the document was last modified, and an identifier indicating who last modified the document. According to some embodiments, an appropriate icon may be display along with each document name (e.g., indicating that the document is a spreadsheet or word processing file). Moreover, according to other embodiments, meta-data associated with item may be displayed in the supplemental content area 420. As illustrated in FIG. 4, the supplemental content area 420 may further include a refresh icon 422 that be selected by a user (e.g., to initiate another access of information from a supplemental server by a client device). Note that the illustration provided in FIG. 4 is only one example of a user interface that might provide support for a document library in accordance with some embodiments of the present invention. Moreover, additions to this interface and/or other user interfaces might support other lists and/or other libraries.

According to some embodiments, a user may perform additional operations in connection with the supplemental content. For example, a user might select an open icon 424 open another browser window with the current lint (e.g., but perhaps in SharePoint itself). Similarly, a user might edit a document in the documents list, check-out a document in the documents list, and/or check-in a document in the documents list. According to some embodiments, a may further be able to edit a document via the supplemental content area 420 (e.g., using a native application associated with that document).

Figure 5:
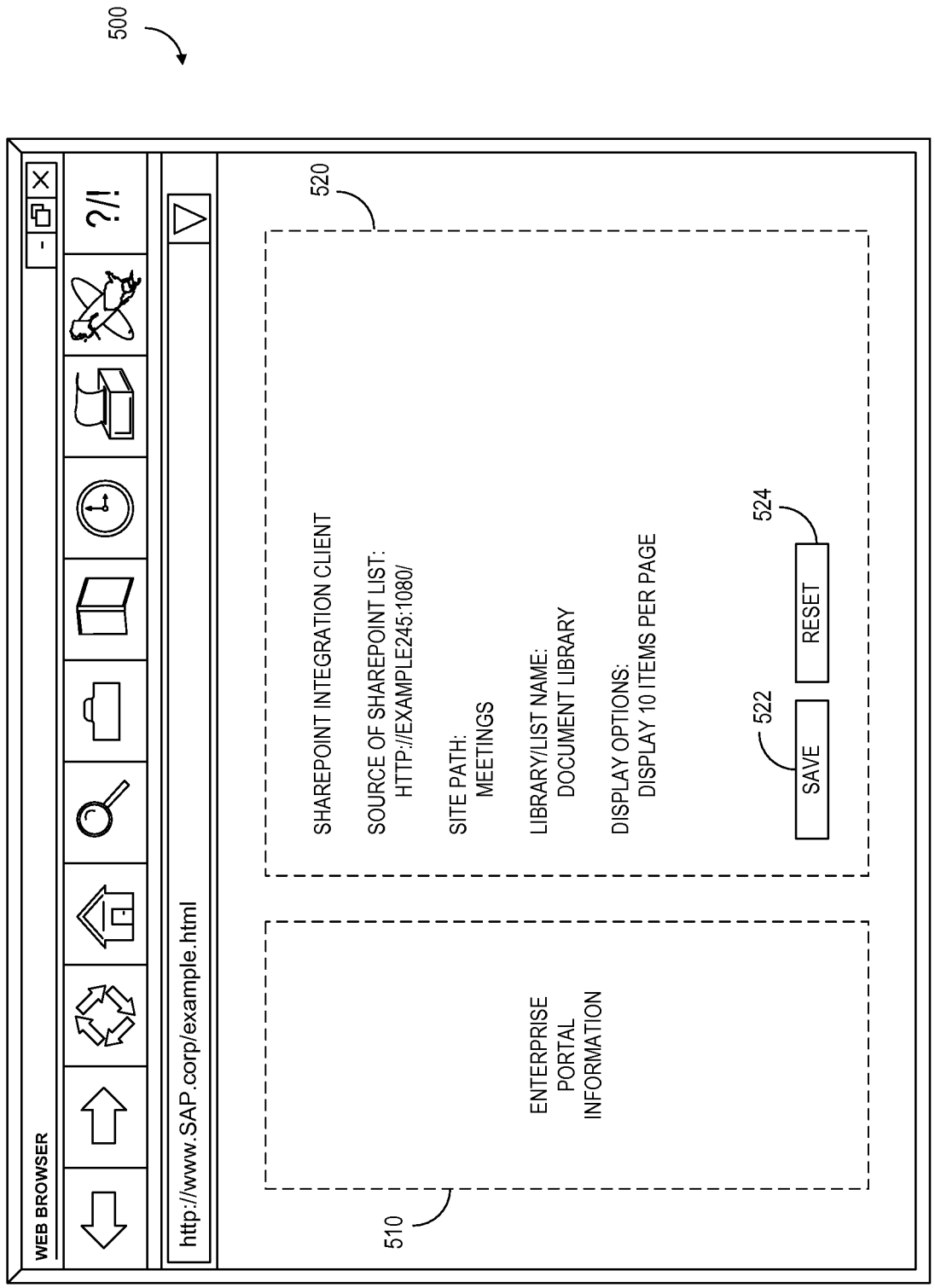
FIG. 5 is an example of a graphical user interface display associated with integrated content in accordance with some embodiments.

Note that the various user mappings (including security credentials and/or authentication information), settings, and/or configuration information be me stored and maintained at the client. According to some embodiments, the list's configuration and/or settings information may be saved at the server side (e.g., the enterprise portal). For example, FIG. 5 illustrates a Graphical User Interface (GUI) display 500 associated with integrated content in accordance with some embodiments. As before, an enterprise portal information area 510 is provided along with a supplemental content area 520. In this case, the supplemental content area 520 may be utilized by a user to provide a source of a SharePoint list, such as a Uniform Resource Locator (URL) address, a site path associated with a SharePoint server, a SharePoint library and/or list name, and one or more display options (e.g., defining how many document names should be displayed on a single page).

Note that a user may be allowed to configure supplemental settings in a number of different ways. For example, based on a policy associated with the user, he or she might be allowed to access any supplemental server, only servers from a pre-approved "white list" (e.g., he or she might be presented with a list of root URL address associated with approved servers), or any server that does not appear on a "black list."

According to some embodiments, a save icon 522 may be provided to let the user store these SharePoint integration client settings and/or a reset icon 524 may be provided to let a user return these settings to default values.

Figure 6:
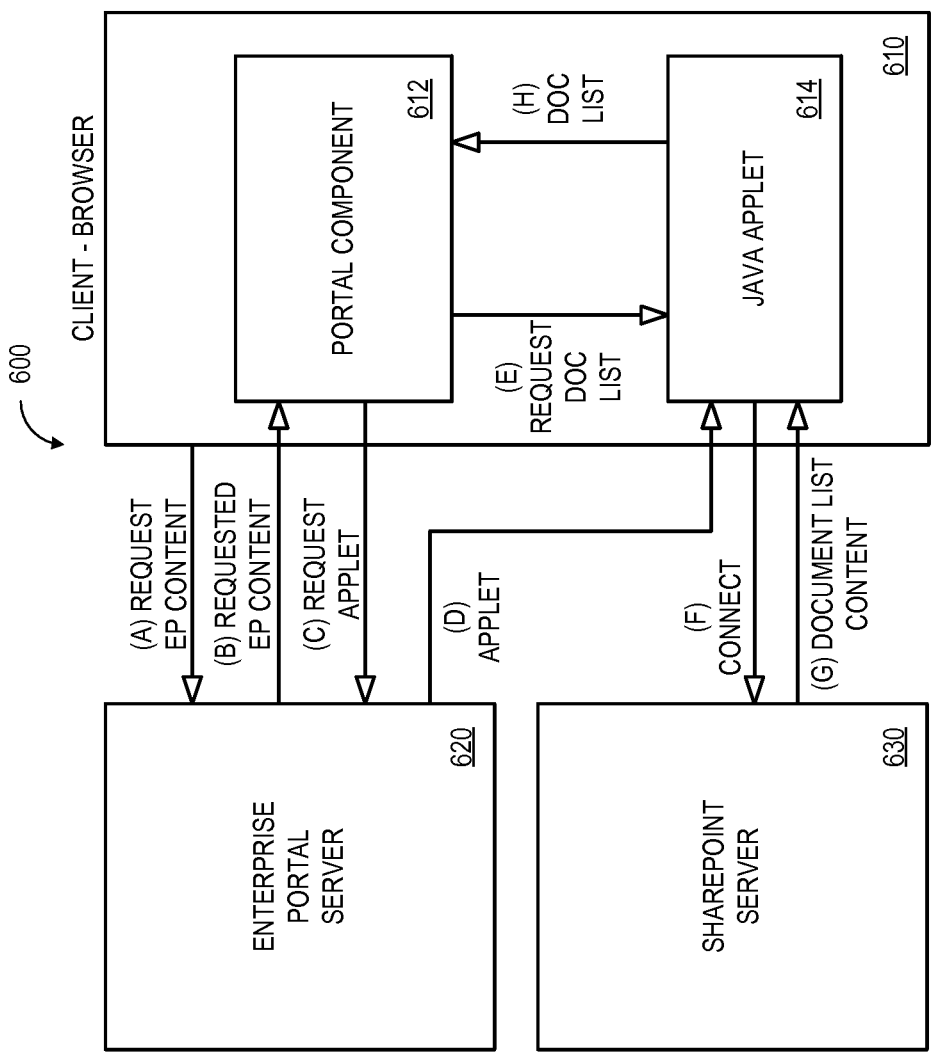
FIG. 6 is a block diagram of a system wherein a client apparatus may display integrated content to a user according to another embodiment.

Although FIG. 2 illustrates one embodiment of the present invention, note that other embodiments may be provided. For example, FIG. 6 is a block diagram of a system 600 wherein a client browser 610 may display integrated content to a user. As before, the client browser 610 may be associated with, for example, a Web application executing at a user's PC or workstation. Moreover, the client browser 610 may request enterprise portal content from a remote enterprise portal server 620 at (A). The enterprise portal server 620 may then respond with the requested enterprise portal content at (B).

According to this embodiment, a portal component 612 executing at the client browser 610 requests an applet from the enterprise portal server 620 at (C). As used herein, the term "applet" might refer to any software component that runs in the context of another program (e.g., to perform a relatively narrow function), including a Java program, a java script program, an ActiveX component, and/or a widget. The enterprise portal server 620 may then download and install the applet 614 to the client browser 610 at (D). According to some embodiments, the applet requested at (C) is a client rendering technology selected based at least in part on a domain associated with a subsequent retrieval of supplemental information.

The portal component 612 may then send a request for a list (e.g., a document list or another type of list) to the Java applet 614 at (E). The request might include, for example, a request for specific data including a URL address. In response to the request, the applet 614 may establish a connection with a SharePoint server 630 at (F). Note that the applet 614 may handle authentication and associated security measures with the SharePoint server 630. Such an approach may avoid, for example, security restrictions that might result if the portal component 612 attempted to consume data directly from the SharePoint server 630.

The SharePoint server 630 can then transmit the list's content to the Java applet 614 at (G), which in turn can provide a document list to the portal component 612 at (H). Note that the SharePoint server 630 might, according to some embodiments, be in a domain external to the client browser 610 and/or enterprise portal server 620. The portal component 612 may then integrate the document list from the SharePoint server 630 with the enterprise portal content from the enterprise portal server 620 and provide the integrated content via a user interface display. Because the client browser 610 directly interacts with the SharePoint server 630, user authentication information can be stored, and managed, locally to the client browser 610 instead of the enterprise portal server 620.

Thus, embodiments may provide for an improved integration of supplemental content into an enterprise portal display (e.g., associated with a collaborative portal that consumes SharePoint lists and/or libraries). Moreover, the integration may be facilitated in an efficient and convenient manner.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although embodiments have been described as being used to develop a business information portal, embodiments may be used with respect to other types of portals. Moreover, although particular types of supplemental content have been described, embodiments may be associated with any other type of appropriate supplemental content.

The several embodiments described herein are solely for the purpose of illustration. Persons skilled in the art will recognize from this description other embodiments may be practiced with modifications and alterations limited only by the claims.

What is claimed is:

1. A method associated with a business enterprise portal, comprising:
    transmitting, by a portal component executing at a client device to an enterprise portal server, a request for enterprise portal content from the enterprise portal server associated with a business warehouse database wherein the client device stores and manages user mapping information and the enterprise portal server does not store or manage user mapping information;
    receiving the enterprise portal content from the enterprise portal server;
    transmitting to the enterprise portal server a request for a Java applet;
    receiving the Java applet from the enterprise portal server;
    executing the applet at the client device;
    transmitting a requested document list from the portal component to the Java applet at the client device;
    transmitting, by the Java applet to a remote document server, a connect request;
    receiving, by the Java applet from the remote document server, requested document list content;
    transmitting, from the Java applet to the portal component, a document list based on the requested document list content at the client device; and
    integrating, at the client device, the document list into the enterprise portal content on a user interface display.

2. The method of claim 1, wherein the user interface display comprises a browser displaying an enterprise portal comprising an enterprise portal information area and a supplemental content area to expose a list-like portlet from one portal in another.

3. The method of claim 1, wherein the document server is associated with a browser-based collaboration and document-management platform.

4. The method of claim 3, wherein the wherein the document list further includes all of: (i) a SharePoint document list, (ii) a SharePoint library, or (iii) a supplemental list list, (iv) a library, and (v) a webpart.

5. The method of claim 4, further comprising:
opening, by the client, of a document associated with the document list.

6. The method of claim 3, wherein the document list is associated with at least one of: (i) a text file, (ii) a word processing file, (iii) a spreadsheet file, (iv) a library, (v) a presentation file, (vi) calendar information, (vii) a webpart or (viii) a portlet.

7. The method of claim 3, wherein the client may perform, in connection with information associated with the document list: (i) editing of a document in the documents list, (ii) checking-out a document in the documents list, or (iii) checking-in a document in the documents list.

8. The method of claim 1, further comprising saving (i) a configuration associated with the document list and (ii) settings associated with the remote document server at the enterprise portal server, wherein the configuration associated with the document list defines how many document names are to be displayed in the document list.

9. The method of claim 1, wherein the remote document server is a Sharepoint server and the supplemental content area comprises content from the Sharepoint server.

10. The method of claim 1, wherein the remote document server is associated with a list of approved servers.

11. The method of claim 1, wherein the remote document server is not associated with a list of non-approved servers.

12. A workstation, comprising:
a portal component executing at the workstation;
an enterprise portal server interface associated with a enterprise portal server and wherein the workstation stores and manages user mapping information and the enterprise portal server does not store or manage user mapping information; and
a supplemental server interface to exchange information associated with at least one of: (i) a browser-based collaboration platform, or (ii) a browser-based document-management platform,
wherein the portal component is adapted to: (i) request enterprise portal content through the enterprise portal server, (ii) receive the enterprise portal content through the enterprise portal server interface, (iii) establish a connection with a supplemental server through the supplemental server interface, (iv) receive a list's information associated with the supplemental server, and (v) integrate the list's information with the enterprise portal content on a user interface display by providing an enterprise portal information area and a supplemental content area to expose a list-like portlet from one portal in another, wherein the supplemental server interface is adapted to prevent access to supplemental servers not included on a white list.

13. The workstation of claim 12, wherein the portal component is part of a client browser application.

14. The workstation of claim 13, wherein the client browser application further comprises a Java applet component between the portal component and the supplemental server interface.

15. The workstation of claim 14, wherein the Java applet component is adapted to: (i) receive a request for a document list from the portal component, (ii) facilitate the connection with a supplemental server through the supplemental server interface, (iii) receive the list's content through the supplemental server interface, and (iv) provide a list to the portal component for integration with the enterprise portal content on a user interface display.

16. The workstation of claim 12, wherein the supplemental server interface comprises an interface with a SharePoint server.

17. A non-transitory, computer-readable medium storing processor-executable process steps that, when executed by a processor, perform a method, wherein the method comprises:
transmitting, by a portal component executing at a client device to an enterprise portal server, a request for enterprise portal content from the enterprise portal server associated with a business warehouse database wherein the client device stores and manages user mapping information and the enterprise portal server does not store or manage user mapping information;
receiving the enterprise portal content from the enterprise portal server;
transmitting to the enterprise portal server a request for a Java applet;
receiving the Java applet from the enterprise portal server;
executing the Java applet at the client device;
transmitting a requested document list from the portal component to the Java applet;
transmitting, by the Java applet to a remote document server, a connect request;
receiving, by the Java applet from the remote document server, requested document list content;
transmitting, from the Java applet to the portal component, a document list based on the requested document list content; and
integrating, at the client device, the document list into the enterprise portal content on a user interface display.

18. The computer-readable medium of claim 17, wherein the user interface display comprises a browser displaying an enterprise portal comprising an enterprise portal information area and a supplemental content area to expose a list-like portlet from one portal in another.

19. The computer-readable medium of claim 18, wherein the document server is associated with a browser-based collaboration and document-management platform.

20. The computer-readable medium of claim 19, wherein the document server is a SharePoint server.

* * * * *